(12) United States Patent
Delaney et al.

(10) Patent No.: US 9,315,279 B2
(45) Date of Patent: Apr. 19, 2016

(54) CONTAINER FOR TRANSPORTING ITEMS OF LUGGAGE IN A SORTING SYSTEM AND SORTING SYSTEM

(71) Applicant: SIEMENS AKTIENGESELLSCHAFT, Munich (DE)

(72) Inventors: David Delaney, Nuremberg (DE); Balthazar-Simon Ten Berge, Seligenstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/404,692

(22) PCT Filed: May 6, 2013

(86) PCT No.: PCT/EP2013/059369
§ 371 (c)(1),
(2) Date: Dec. 1, 2014

(87) PCT Pub. No.: WO2013/178431
PCT Pub. Date: Dec. 5, 2013

(65) Prior Publication Data
US 2015/0114804 A1 Apr. 30, 2015

(30) Foreign Application Priority Data
May 29, 2012 (DE) .......... 10 2012 208 997

(51) Int. Cl.
*B65G 21/20* (2006.01)
*B65D 1/34* (2006.01)
(Continued)

(52) U.S. Cl.
CPC .......... *B64F 1/368* (2013.01); *B64F 1/366* (2013.01); *B65G 17/12* (2013.01)

(58) Field of Classification Search
CPC .......... B65G 21/20
USPC .......... 198/836.1, 837, 840; 206/557
See application file for complete search history.

(56) References Cited

U.S. PATENT DOCUMENTS 3,695,462 A * 10/1972 Sullivan .......... 414/273
3,767,036 A * 10/1973 McLeod .......... 206/315.1
(Continued)

FOREIGN PATENT DOCUMENTS

DE 60206062 T2 6/2006
EP 1609745 A2 12/2005
(Continued)

*Primary Examiner* — Douglas Hess
(74) *Attorney, Agent, or Firm* — Laurence Greenberg; Werner Stemer; Ralph Locher

(57) ABSTRACT

A container for transporting luggage items in an airport sorting system using a conveyor system for conveying the luggage items, includes a bottom region for coupling to a conveying unit of the conveyor system and a transporting region supported by the bottom region and receiving a luggage item to be transported. The bottom and transporting regions are each produced from x-ray transparent or radiolucent material. In order to provide a container which can be produced with low expenditure, is robust with regard to transport processes and is as homogeneous as possible with regard to being x-ray transparent or radiolucent, the bottom and transporting regions are formed from a basic body produced in one piece and from an x-ray transparent or radiolucent material and the basic body is formed from a foam perform or molded part. A sorting system for airport luggage items is also provided.

13 Claims, 6 Drawing Sheets

(51) Int. Cl.
  *B65D 1/40* (2006.01)
  *B64F 1/36* (2006.01)
  *B65G 17/12* (2006.01)

(56) References Cited

U.S. PATENT DOCUMENTS

| | | | | |
|---|---|---|---|---|
| 3,971,470 | A | * | 7/1976 | White .......................... 206/455 |
| 5,388,684 | A | * | 2/1995 | Peck .......................... 198/465.1 |
| 5,841,833 | A | * | 11/1998 | Mazess ................. A61B 6/032 |
| | | | | 250/367 |
| 6,070,714 | A | * | 6/2000 | May .............................. 198/840 |
| 6,279,721 | B1 | * | 8/2001 | Lyngso et al. ............ 198/369.2 |
| 6,540,064 | B1 | * | 4/2003 | Bodewes et al. ........... 198/465.1 |
| 6,666,032 | B1 | | 12/2003 | Rickson et al. |
| 7,131,523 | B2 | * | 11/2006 | Brixius et al. ............. 198/465.2 |
| 7,575,112 | B2 | * | 8/2009 | Lowes et al. .................. 198/358 |
| 7,633,390 | B2 | * | 12/2009 | Ambrefe, Jr. ........... B65D 1/34 |
| | | | | 109/19 |
| 7,921,990 | B2 | | 4/2011 | Sorensen |
| 8,820,530 | B1 | * | 9/2014 | Blagg .......................... 206/557 |
| 8,867,816 | B2 | | 10/2014 | Bouchard et al. |
| 2003/0062373 | A1 | | 4/2003 | Holland |
| 2005/0072653 | A1 | * | 4/2005 | Brixius et al. |
| 2007/0132580 | A1 | | 6/2007 | Ambrefe, Jr. |
| 2010/0236895 | A1 | * | 9/2010 | Brutt |

FOREIGN PATENT DOCUMENTS

| | | |
|---|---|---|
| FR | 2825685 A1 | 12/2002 |
| WO | 0102268 A1 | 1/2001 |
| WO | 03026976 A1 | 4/2003 |
| WO | 2009043145 A1 | 4/2009 |

* cited by examiner

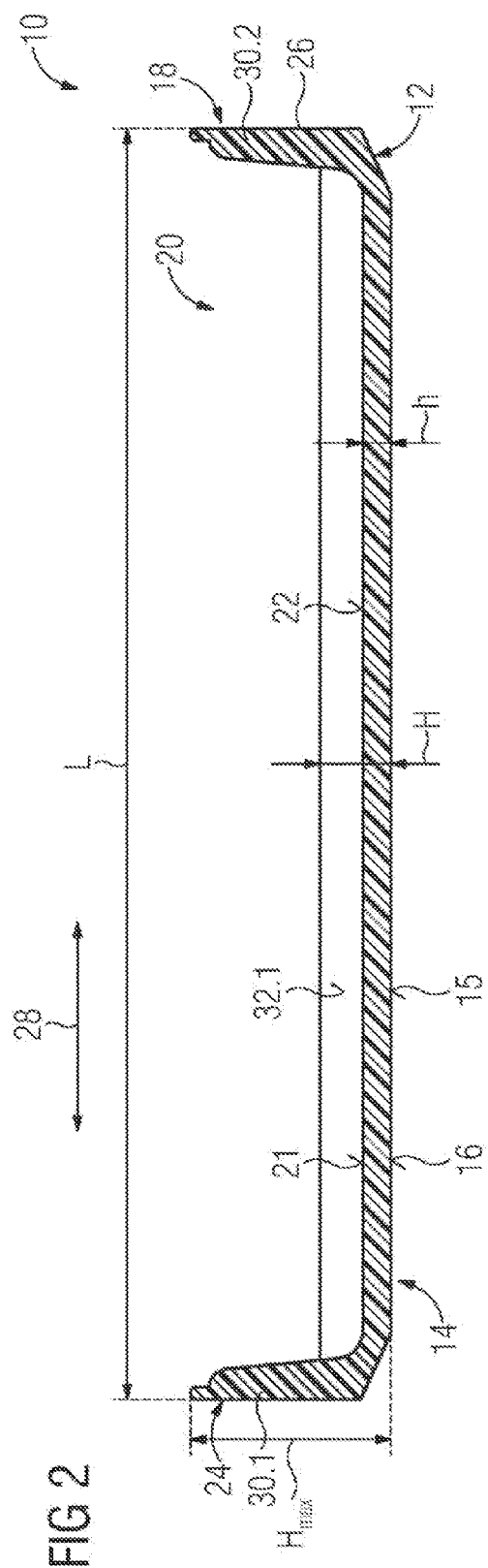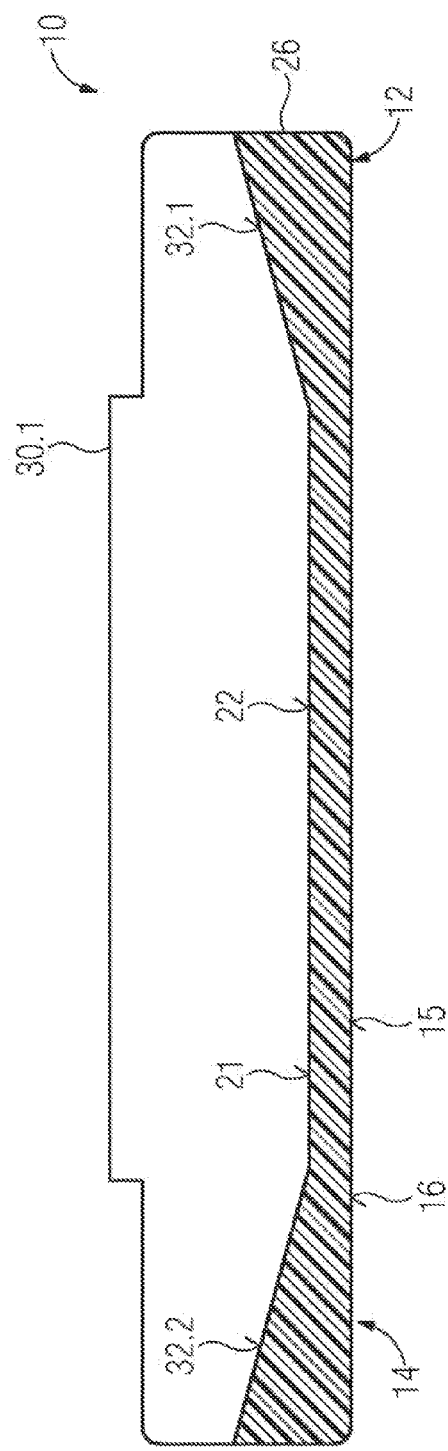

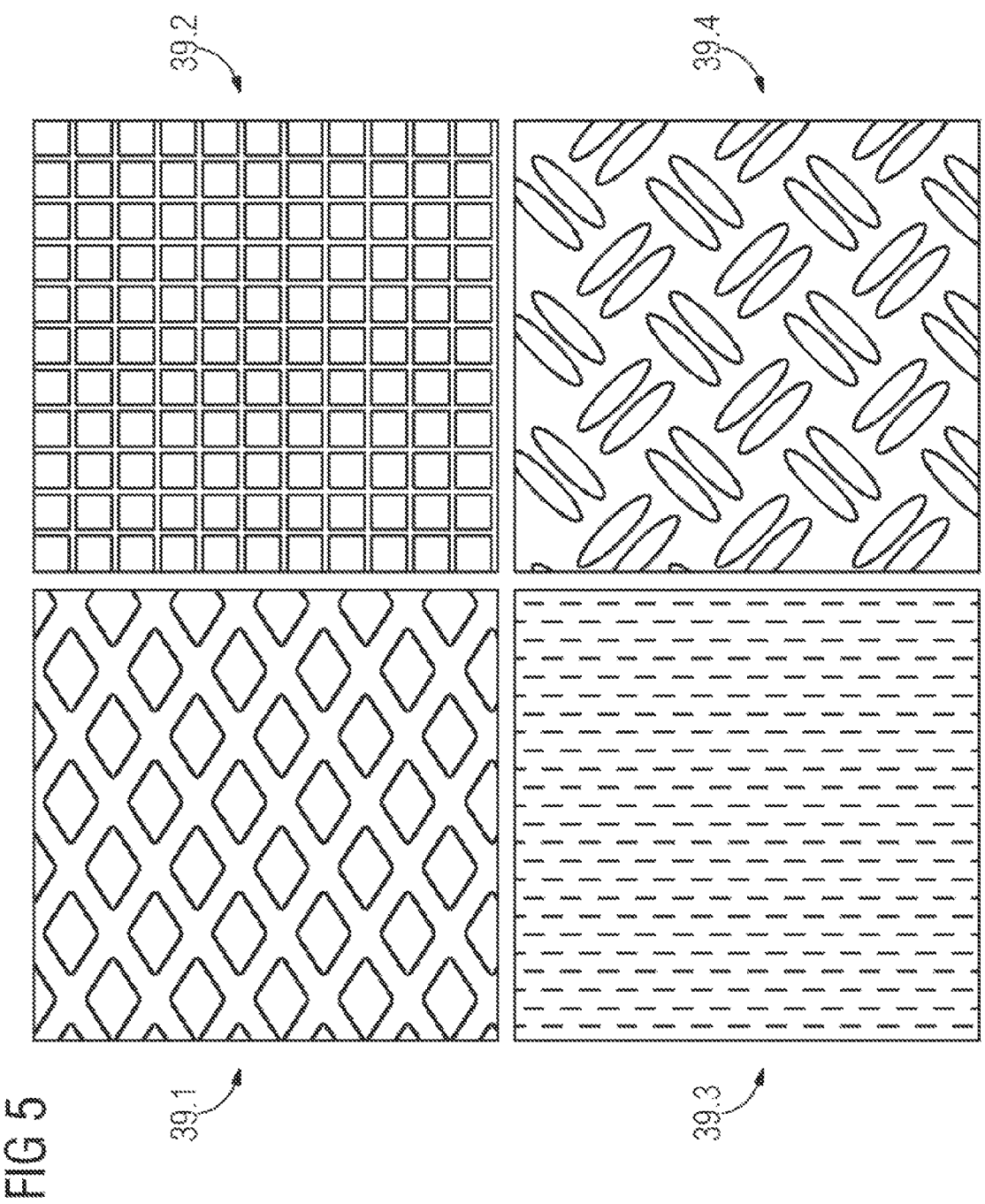

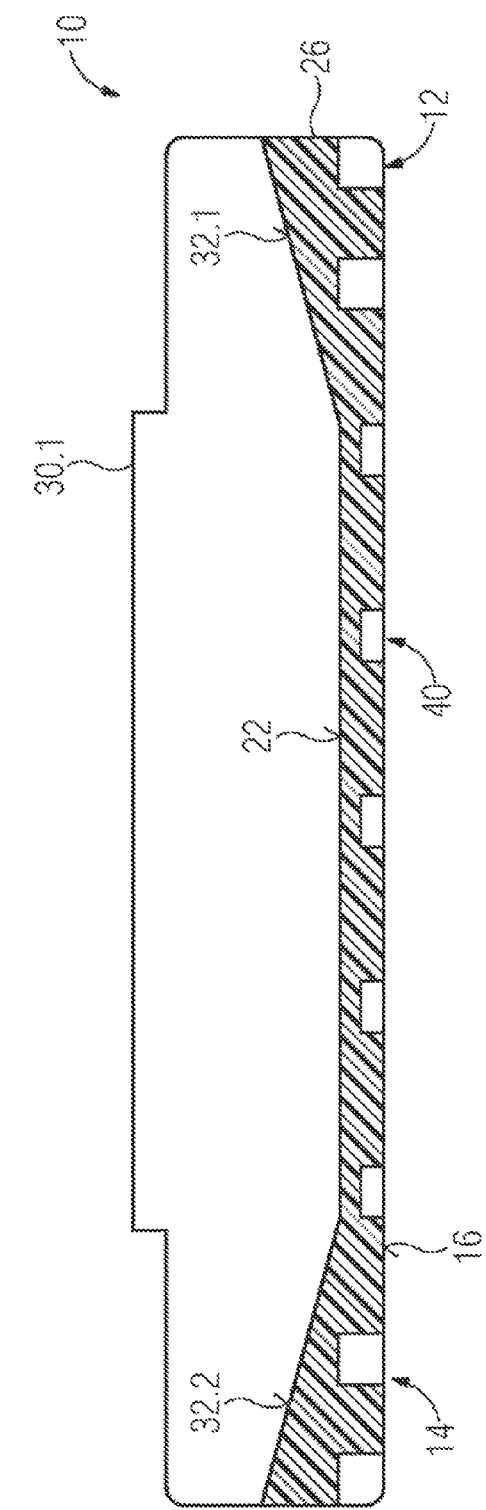
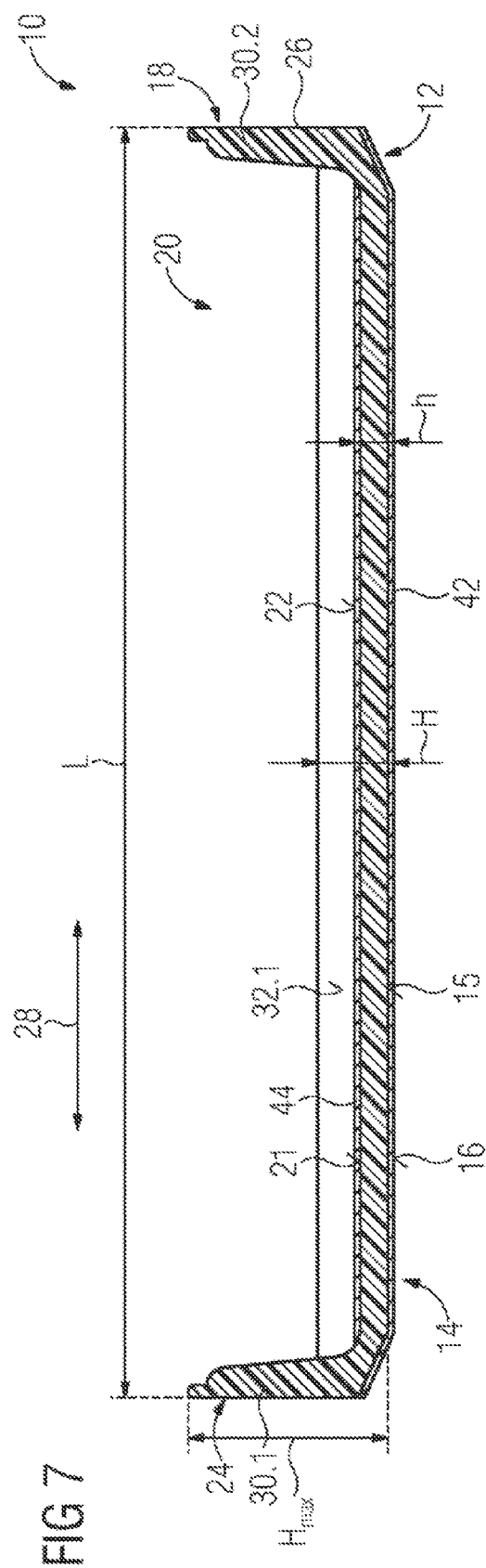

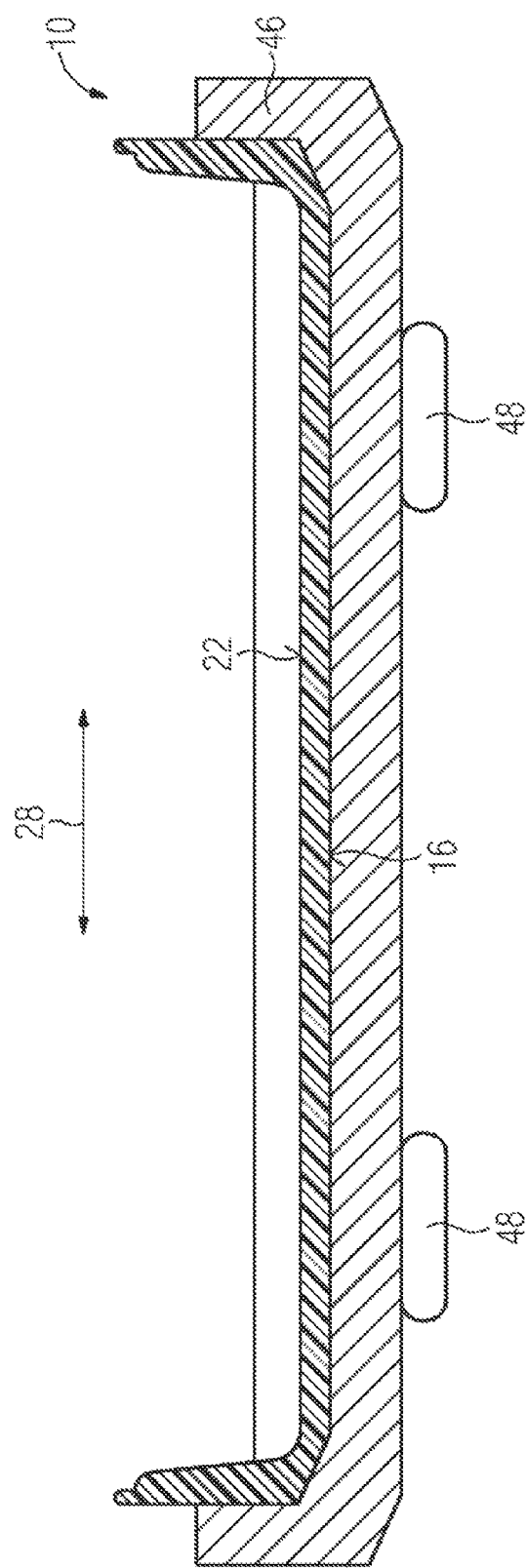

CONTAINER FOR TRANSPORTING ITEMS OF LUGGAGE IN A SORTING SYSTEM AND SORTING SYSTEM

BACKGROUND OF THE INVENTION

Field of the Invention

The invention relates to a container for transporting items of luggage in a sorting system at an airport using a conveying system for conveying individual items, in particular for conveying items of luggage. The container has a bottom region for coupling with a conveying unit of the conveying system and a transporting region which is supported by the bottom region and is provided for receiving an individual item of luggage to be transported, wherein the bottom region and the transporting region are produced in each case from a radiolucent material. The invention also relates to a sorting system for items of luggage at an airport. The sorting system includes a conveying system having conveying units for conveying items of luggage, and containers according to the invention which are coupled with a conveying unit for transporting the items of luggage.

When conveying items of luggage during a sorting process, they can be transported directly by a conveyor of the conveying system, such as, for example, a band conveyor, belt conveyor and/or roller conveyor. As the shape and dimensions of the items of luggage can differ enormously from one another, as an alternative to this or in addition to it, containers are used for receiving the items of luggage and they serve in an advantageous manner as a standard transporting means for the conveying system. The conveying system can accordingly be designed according to the known characteristics of the container. In an advantageous manner, the position and the tracking of the individual items of luggage within the conveying system is also better controlled. This is advantageous in particular with regard to the transporting operations which the items of luggage usually have to complete within a conveying system and during which the items of luggage are subject to shocks, sudden and rapid accelerations as well as changes in direction.

The contents of the items of luggage to be transported are checked for security purposes. This is usually effected by means of X-ray-based screening, in particular screening that is based on computer-imaging technology.

In order to keep down operating expenditure incurred during such screening, it is advantageous to provide a container of the above-described type which is sufficiently permeable to X-rays. Consequently, there is no need to unload and reload a container prior to and after the screening. WO 03/026976 A1 has already proposed a container which is suitable for X-ray-based screening.

BRIEF SUMMARY OF THE INVENTION

The object underlying the invention is to provide a generic container which can be produced at little expenditure, is sturdy in relation to the above-named transporting operations and is realized in as homogenous a manner as possible with reference to the radiolucency.

It is proposed to this end that the bottom region and the transporting region are formed by a basic body which is produced in one part and from a radiolucent material, wherein the basic body is formed by a foamed material molded part. As a result of providing the container with a basic body consisting of one part, low production expenditure can be achieved. In particular, there is no need to move two parts for the bottom region and the transporting region together, as a result of which it is possible to save on production and assembly steps. Adaptations in the shaping of the basic body can additionally be effected at less expenditure on account of the reduction in the number of components. In addition,—in contrast to solutions having a transporting region and a bottom region from two different components—increased sturdiness can be achieved within a conveying system in relation to the above-mentioned transporting operations. The basic body, in this connection, is free of interfaces at which relative movements between the transporting region and the bottom region can occur on account of the transmission of force. By no such interfaces being present, increased homogeneity in the radiolucency of the container can be achieved. As a result of forming the basic body from a foamed material molded part, it is possible to provide a particularly light container which nevertheless comprises a high load-bearing capacity with regard to typical transporting operations. As a result of the high degree of flexibility of the foamed material, the container is able to absorb high energy shocks which arise in said transporting operations or to be subject to heavy loads without irreversible deformations occurring.

A "foamed material molded part" is to be understood in particular as a component which is the result of a shaping process using foamed material, in particular the result of a molding process.

A "radiolucent" material is to be understood as a material which comprises a permeability of at least 50%, in an advantageous manner at least 75% and in a particularly preferred manner at least 90% in relation to an X-ray. These types of permeability can be achieved in particular with materials which comprise an effective atomic number $Z_{eff}$ which meets the condition $Z_{eff} < 7$.

The container preferably comprises a bottom surface which is coupled with the bottom region of the basic body and during transport by means of the conveying system abuts against the conveying unit, for example a conveyor belt, conveying rollers etc. The coupling of the bottom region with the conveying unit is effected in this connection in a preferred manner by means of a frictional connection between the bottom surface of the container and a surface of the conveying unit. In this connection, the bottom surface is advantageously realized in a flat manner in order to maximize the contact area with the conveying unit. A flat bottom surface additionally enables the container to be advantageously transported by means of a roller conveyor.

The bottom region which is formed by the basic body comprises in an expedient manner on the bottom side thereof a surface which, during transport by means of a conveying unit, faces the conveying unit. Said surface of the bottom region can correspond to the bottom surface of the container. In said realization, the bottom surface of the container is formed by the basic body which abuts against the conveying unit during transport.

As an alternative to this or in addition to it, it is possible to provide a means which is mounted on the surface of the bottom region of the basic body or the surface of the bottom region is coupled in a covering manner with the basic body, and which forms the bottom surface of the container. The means can be a coating which adheres to the surface of the bottom region by means of a positive bond and/or a covering means which is mounted on the bottom region—in particular as a result of producing positive locking and/or frictional locking—and is preferably able to be separated from said bottom region.

In an expedient manner the container comprises a receiving surface which is coupled with the transporting region of the basic body and is preferably aligned at least substantially parallel to the bottom surface. The container is suitable in particular for transporting items of luggage within a sorting system, the receiving surface serving in an advantageous manner for receiving an individual item of luggage. However, it can also serve for transporting parcels, packages and other individual items.

The transporting region which is formed by the basic body expediently comprises on the top side thereof a surface which, when transporting an individual item, faces said item. Said surface of the transporting region can correspond to the receiving surface of the container. In said realization, the receiving surface of the container is formed by the basic body against which the individual item to be transported abuts.

As an alternative to this or in addition to it, it is possible to provide a means which is mounted on the surface of the transporting region of the basic body or the top surface of the transporting region is coupled in a covering manner with the basic body, and which forms the receiving surface of the container. The means can be a coating which adheres to the surface of the transporting region by means of a positive bond and/or a covering means which is mounted on the transporting region—in particular as a result of producing positive locking and/or frictional locking—and is preferably able to be separated from said transporting region.

In addition, coatings and/or covering means can be mounted on the basic body in the region of the end faces and/or the further lateral walls of the container—with reference to a conveying direction. In particular, they can have a protective function in corner or edge regions of the container. A coating on multiple sides, in particular on all sides of the basic body is conceivable. In a particular realization, it is additionally conceivable for a covering unit which covers several sides of the basic body to be used or for the basic body to be embedded at least in part in said covering unit.

In the above-mentioned realizations, the basic body provides the shape of the container, the attaching of any coatings and/or covering means to the basic body not bringing about any considerable change in the shape of the container. The function of the above-mentioned coatings and/or covering means for attaching to the basic body is to provide specific surface characteristics, e.g. with reference to a coefficient of friction or to a mechanical strength or to protect edge regions. In particular, the basic body forms at least 60%, in an advantageous manner at least 75% and in a preferred manner at least 85% of the entire container volume.

It is possible to use different materials to produce the foamed material. In particular, the use of closed-cell-foams is preferred in order to achieve a high degree of surface strength in relation to liquids.

In a preferred embodiment of the container according to the invention, the basic body is produced from a structural rigid foam of thermoplastic material. Common production methods can be applied and low production costs are achieved as a result. In particular, the basic body can be the result of an injection molding method using a thermoplastic material.

A particularly advantageous realization provides that the basic body is formed from a foamed material molded part, the foamed material molded part comprising a thermoplastic-based particle foamed material. When such materials are shaped, in particular in a molding process, it is possible to provide a basic body which comprises very homogeneous material density distribution over the entire foamed material molded part.

In said connection, it is possible to provide a basic body with a low average density and consequently a low weight when the foamed material molded part comprises a polypropylene-based particle foamed material. In particular, it is possible to achieve average material densities within the range of 0.9 g/cm³. Along with a high degree of sturdiness, advantageous soundproofing and a high degree of radiolucency can also be achieved as the material used comprises a typical effective atomic number within the range of $Z_{eff} \approx 5.5$. In addition, said material can be easily recycled. As a result of realizing the container with an integral basic body from said material, it is additionally possible to provide a container which is realized free of metal, which, with regard to acceptance for X-ray screening by screening authorities, is of particular advantage. In addition, said material is free of halogen gas and fuel gas.

Further materials such as polyethylene (PE), polystyrene (PS), polyamide (PA) or polyurethane (PU), in particular a PE-based, PS-based, PA-based or PU-based particle foamed material can be used in further realizations.

In order to achieve a further reduction in weight, it is proposed in a further realization variant that the basic body comprises internal recesses. These can be realized totally enclosed by the basic body material or open to the outside at least in part. The recesses are preferably arranged in the region of the end faces of the container—with reference to a conveying direction of the container. In addition, advantageous sound absorption can be achieved as a result of the recesses.

The recesses can be formed, for example, by an internal grid structure of the basic body which serves for the purpose of increasing the flexibility of the basic body in relation to the above-mentioned transporting operations. Said realization is particularly suitable for producing the basic body with a material which is different to a foamed material.

In addition, it is proposed that a central, flat receiving surface is arranged in the transporting region for receiving an individual item, which receiving surface is surrounded by a holding structure which is raised above the receiving surface. As a result of the container having a flat receiving surface which is arranged centrally on the top side of the transporting region, increased stability of the individual item to be transported can be achieved—in contrast to a curved realization. In particular, the probability of the individual item lying flat during transport is advantageously increased. It is possible to carry out the X-ray screening in a more efficient manner in said lying position. The holding structure serves in an advantageous manner for the purpose of holding the received individual item on the receiving surface during transport. The holding structure preferably surrounds the receiving surface which is arranged in an indentation of the basic body in relation to said holding structure. The receiving surface of the container—as already mentioned above—can be formed by the basic body and/or by a coating or a covering means. In said connection, it is proposed that the holding structure comprises wall parts which adjoin the flat receiving surface, are raised perpendicularly with respect to said receiving surface and—relative to a conveying direction—form a front or rear edge. As a result, it is possible, in a particularly efficient manner, to avoid an individual item that has been received leaving the receiving surface on account of severe acceleration or braking in the conveying direction of the container.

In addition, advantageous protection against centrifugal forces which occur during transport can be achieved when the holding structure comprises a pair of flat transition surfaces which are inclined in relation to the receiving surface and on both sides of the receiving surface connect to said receiving surface and in each case—relative to a conveying direction—form a lateral edge of the container. The transition surfaces serve in an expedient manner for a received individual item to pass from the container to a further conveying element. They serve in an advantageous manner as sliding surfaces on which the individual item slides when the container is in an inclined position. In order to enable such a transition and nevertheless to achieve efficient protection against centrifugal forces, the transition surfaces in each case preferably form an obtuse angle, in a preferred manner an angle greater than 135°, in particular greater than 145°.

Particularly efficient protection can be achieved when a bottom surface is arranged in the bottom region and the inclined transition surfaces comprise a maximum height relative to the bottom surface, wherein the receiving surface comprises a height relative to the bottom surface which is smaller than 50% of the maximum height of the transition surfaces. The "height" is to be understood in particular as an extension which is perpendicular to the flat bottom surface or to the receiving surface.

In addition, it is proposed that a bottom surface is arranged in the bottom region and the holding structure comprises a maximum height relative to the bottom surface, wherein the receiving surface comprises a height relative to the bottom surface which is smaller than 20% of the maximum height of the holding structure. As a result of the chosen holding structure which is high when viewed in relation to the height of the receiving surface, increased sturdiness and rigidity of the container can be achieved. Where the receiving surface is arranged lower than the holding structure, the center of gravity of the loaded container is positioned lower and consequently a high level of stability is able to be achieved.

Unused containers are able to be stowed in a particularly space-saving manner when the holding structure comprises in the bottom region and in the transporting region in each case an interface which is provided for the stacking of the containers. The interfaces, in this connection, are realized in an expedient manner so as to correspond to one another.

In order to change the mechanical characteristics of the basic body, in a further realization it is proposed that the basic body comprises at least one surface which is back-injected with a coating. The applying of a coating onto an existing surface of the basic body can be effected, in particular, using a so-called in-mold method where the basic body is back-injected in an injection mold with a material for producing surface structures. Examples of such methods are back-foaming, in-mold-skinning and thermal embossing/thermal stamping.

The object of the invention is also a sorting system for items of luggage in an airport, said sorting system including a conveying system, which comprises conveying units for conveying items of luggage, and containers, which are coupled to a conveying unit for transporting the items of luggage. In this case, the containers are realized as described herein.

BRIEF DESCRIPTION OF THE SEVERAL VIEWS OF THE DRAWING

Exemplary embodiments of the invention are described in more detail by way of the drawings, in which:

FIG. 2: shows a sectional view of the container from FIG. 1

FIG. 3: shows a further sectional view of the container from FIG. 1,

FIG. 5: shows different realizations of a surface structure of the bottom surface of the container from FIG. 1, FIG. 6: shows an alternative realization of the container from FIG. 1 with recesses, FIG. 7: shows an alternative realization of the container with coated surfaces and FIG. 8: shows the container from FIG. 1 and an adapter.

DESCRIPTION OF THE INVENTION

Figure 1:
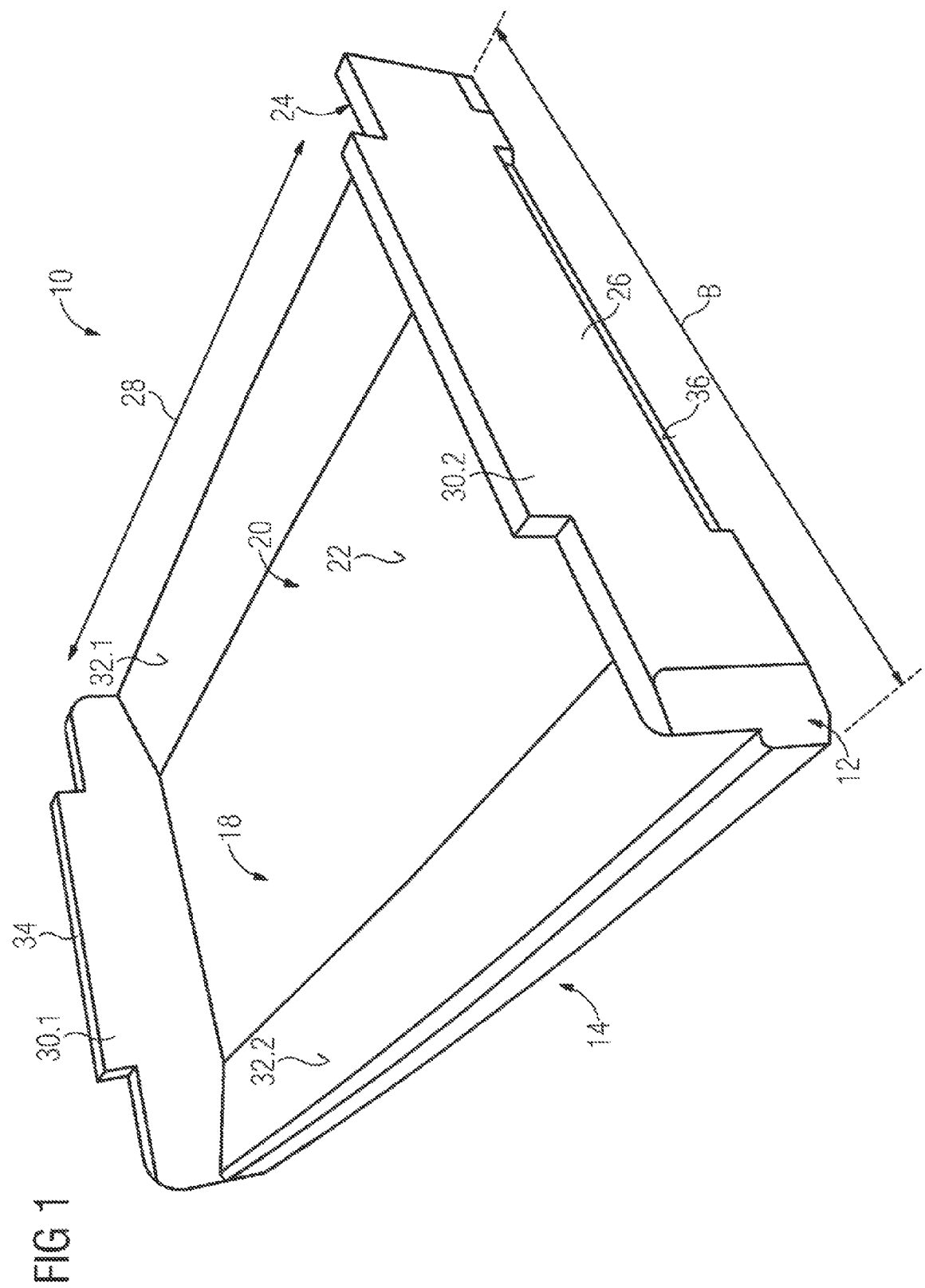
FIG. 1: shows a container for a conveying system.

FIG. 1 shows a perspective view of a container 10 for a conveying system for conveying individual items. In the exemplary embodiment looked at, the container 10 is provided for transporting items of luggage. It can serve, in particular, for processing items of luggage at the airport. Once an item of luggage has been handed in at a check-in counter, the item of luggage, which is provided with an identification means, e.g. in the form of a barcode applied on a baggage label and/or a coded RFID, is loaded onto a container 10 of this type after leaving the check-in area. The container 10 serves as a standard transporting means for transporting the item of luggage through a sorting system up to an unloading point which corresponds to the flight associated with the item of luggage. The sorting operation or the conveying up to the associated unloading point is effected by way of the information which can be taken from the identifications means. The item of luggage is unloaded from the container at said unloading point by the container, for example, being tipped to the side. The container 10 is conveyed in the sorting system by means of a conveying system which can comprise different conveying units, such as, for example, band conveyors, belt conveyors, chain conveyors or roller conveyors.

A bottom region 12 of the container 10 serves for coupling with a conveying unit of the conveying system. Said bottom region comprises a bottom side 14 along which a surface 15 extends. Said surface corresponds to a bottom surface 16 of the container 10 (see FIGS. 2 and 3). The bottom surface 16 is coupled with the conveying unit in such a manner that it entrains the container 10. In particular, the container 10 is coupled with the conveying unit as a result of producing a frictional connection between a surface of the conveying unit and the bottom surface 16. To this end, the bottom surface 16 is realized, in particular, in a flat manner. As an alternative to this or in addition to it, coupling can be effected as a result of producing a positive locking connection.

In addition, the container 10 comprises a transporting region 18 which is supported by the bottom region 12. The transporting region 18 comprises a top side 20 which is located opposite the bottom side 14 and along which a surface 21 extends and on which a holding structure 24 which surrounds said surface is arranged. The surface 12 corresponds to a receiving surface 22 of the container 10 which serves for receiving an individual item of luggage in the realization of the container 10 for a luggage sorting system.

Before the item of luggage is subject to a sorting operation, the contents of the item of luggage are screened by a screening authority. In this connection, the screening is effected by means of X-rays.

The container 10 comprises a basic body 26 which is realized in one part and forms the bottom region 12 and the transporting region 18. The bottom region 12 and the transporting region 18 are accordingly molded integrally on one another. Described another way, the basic body 26 which forms the bottom region 12 and the transporting region 18 is produced from one casting. The surfaces 15 and 21 as well as the holding structure 24 are accordingly joined together in an integral manner. As a result,—unlike in the case of multiple-part containers—in the forming of the bottom and transporting region there is no need for interfaces between different components where relative movements can usually occur on account of the transmission of forces and wear and tear during a transporting operation. In the exemplary embodiment looked at, the surfaces 15 and 21 of the bottom surface 16 or receiving surface 22 of the container 10, i.e. the bottom surface 16 and the receiving surface 22 of the container 10 are formed by the basic body 26. In further realizations, the surface 15 and/or the surface 21 can be coated and/or covered by a covering means (see FIG. 7).

The basic body 26 is produced from a radiolucent material. Said material is an expanded polypropylene (or EPP) which comprises as foamed material a particularly low average material density. It additionally has a high degree of radiolucency, on account of its low effective atomic number. The basic body 26 is accordingly realized as a foamed material molded part which comprises a high degree of flexibility. The basic body 26 can be subject to different operations during transport, such as high-energy shocks, large acceleration or braking movements without irreversible deformations occurring. On account of the characteristic of the polypropylene as thermoplastic material, common production methods, such as in particular molding processes, can be applied, as a result of which particularly low production costs can be achieved.

The container 10 comprises a main extension direction which corresponds, in particular, to the conveying direction 28 in which it is transported. In said conveying direction 28, it comprises a length L (see FIG. 2) which—in order to meet the requirement of a high throughput for the sorting system—has a value of 120 cm. In principle, the length of the container 10 can have a value within the range of between 115 cm and 200 cm.

FIG. 2 shows a sectional view of the container 10 according to a cutting plane which is aligned parallel to the conveying direction 28 and perpendicular to the receiving surface 22. In said drawing, it is possible to see the flat bottom surface 16, the receiving surface 22 which is aligned parallel to said bottom surface 22 and the holding structure 24 which surrounds the receiving surface 22.

The receiving surface 22 is arranged centrally on the top side 20 and is realized in a flat manner. As a result of said flat realization, the receiving surface 22 comprises a height h relative to the bottom surface 16 which is constant over the entire receiving surface. The receiving surface 22 is preferably at least 60% of the bottom surface. The holding structure 24, which serves for holding a received individual item during transport, surrounds the receiving surface 22 and is raised above the same.

The holding structure 24 comprises wall parts 30.1, 30.2 which—extending perpendicularly—adjoin the receiving surface 22. When viewed in the conveying direction 28, said wall parts are arranged opposite one another and in each case on an edge of the container 10. When viewed in the conveying direction 28, the wall parts 30.1, 30.2 form a front or rear edge of the container 10 or end faces of the container 10, the receiving surface 22 being arranged centrally between the wall parts 30.1, 30.2.

In addition, the holding structure 24 comprises a pair of flat transition surfaces 32.1, 32.2 which—when viewed in the conveying direction 28—are arranged on both sides of the receiving surface 22 and in each case—when viewed perpendicularly to the conveying direction 28—connect to said receiving surface in a substantially stepless or continuous manner. Said transition surfaces can also be seen in FIG. 3, which provides a sectional view of the container 10 according to a cutting plane which is perpendicular to the conveying direction 28. The transition surfaces 32 serve—when the container 10 is tipped to the side—as sliding surfaces for the item of luggage to be unloaded and—during transport—for supporting the item of luggage on the receiving surface 22 against centrifugal forces.

The transition surfaces 32 are inclined in relation to the flat receiving surface 22 and form an obtuse angle with the same. In other words, in the cross section shown in FIG. 3 the transition surfaces 32 together form a "V" which is interrupted by the flat receiving surface 22. As can be seen in FIG. 1, the transition surfaces 32 extend in the conveying direction 28 and connect the wall parts 30.1, 30.2 together.

Proceeding from an edge that faces the receiving surface 22, said edge comprising the height of the receiving surface 22, the transition surfaces 32—when viewed perpendicularly to the conveying direction 28—ascend in each case continuously up to a side edge of the container 10 at which the transition surfaces 32 reach a maximum height H. The height h of the receiving surface 22 is smaller than 50% of the maximum height H of the outside edge of the transition surfaces 32, i.e. of the side edge of the container 10. The maximum height H preferably comprises a value within the interval of between 4.5 cm and 15 cm, the value H=7 cm having been chosen in the exemplary embodiment looked at. In an advantageous manner, the height h of the receiving surface 22 comprises a value of 2.5 cm.

The maximum height $H_{max}$ of the holding structure 24 corresponds to the maximum height of the wall parts 30, the height h of the receiving surface 22 being smaller that 20% of the maximum height $H_{max}$. In the exemplary embodiment looked at, $H_{max}$=19 cm, values within the interval of between 15 cm and 30 cm being possible in principle.

The width B of the container 10 (see FIG. 1) preferably has a value within the interval of between 78 cm and 100 cm, B=80 cm being applicable in the exemplary embodiment looked at.

Figure 4:
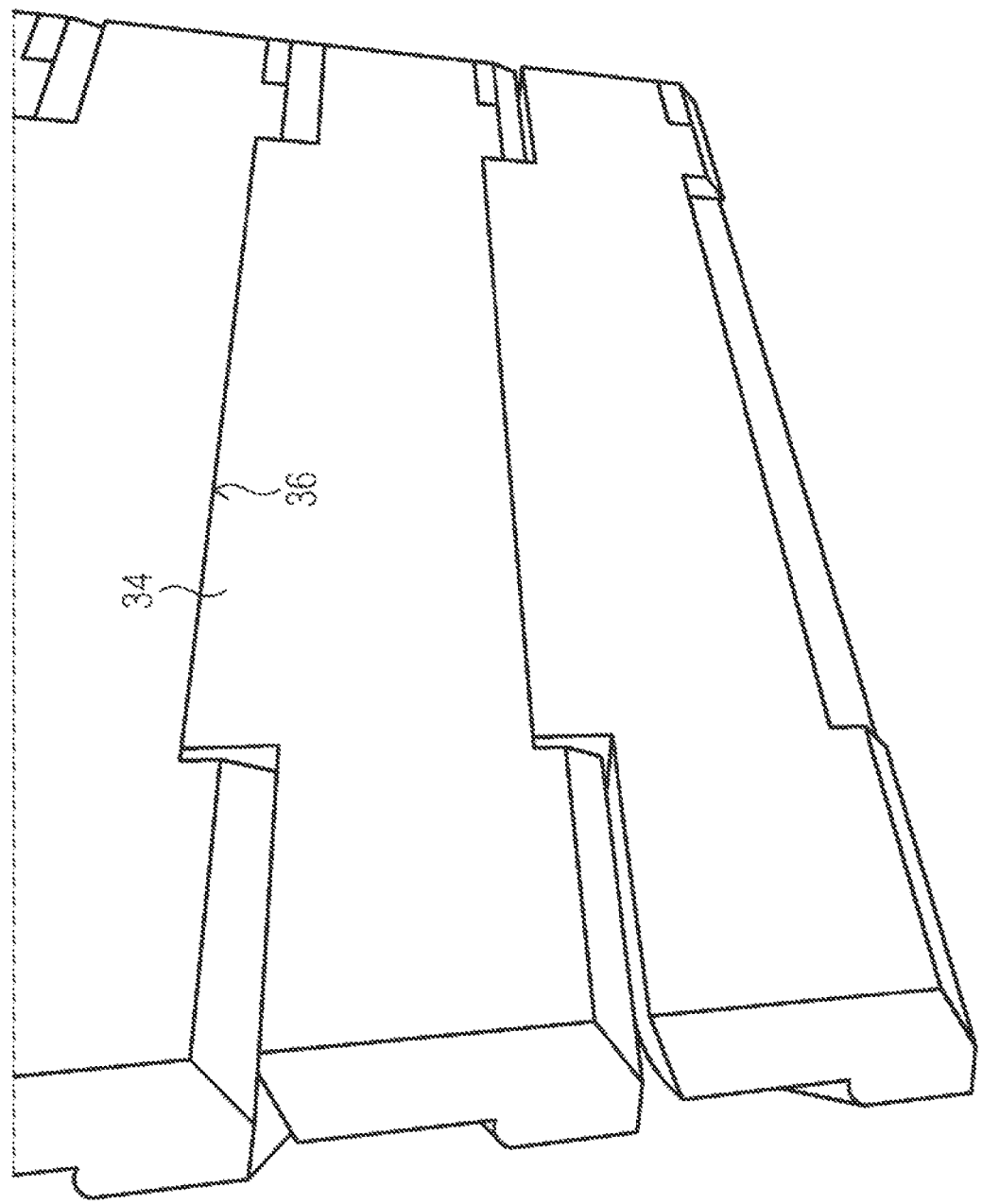
FIG. 4: shows a stack of containers.

The holding structure 24, in particular with the wall parts 30, is provided in the transporting region 18 and in the bottom region 12 of the basic body 26 with interfaces 34 and 36 which are provided especially for stacking, in particular for the simple and compact stacking of several containers 10. The interfaces 34, 36 comprise structures which correspond to one another, in particular elevations and recesses which interact with one another as shown in FIG. 4.

Once they have been produced, the surfaces of the basic body 26 can be reworked. The bottom side 14 can be reworked in such a manner in particular that the bottom surface 16 of the container 10 comprises a surface structure which serves for increasing the coefficient of friction when producing a frictional connection between the bottom surface 16 and a surface of a conveying unit. Surface structures in the form of coatings 39.1 to 39.4 are shown in FIG. 5 as an example.

Stiffening elements which are embedded or admitted in the material of the basic body 26 are also possible for altering the mechanical characteristics of the container 10. Said stiffening elements can be, in particular, plastics material inserts.

In addition, a storing and transmitting unit, for example in the form of an RFID, can be attached onto the bottom side 14 of the container 10 as further reworking of the basic body 26. Identification information of a transported individual item, in particular an item of luggage, can be stored in said storing and transmitting unit. The storing and transmitting unit can be bonded onto the bottom side 14 or it can be fused with the material of the bottom surface 16. The storing and transmitting unit can be mounted on another side of the container 10.

FIG. 6 shows a further realization of the container 10. In order to avoid unnecessary repetition, just the differences to the above-described realization will be explained.

In said realization of the container 10, internal recesses 40 are provided in the basic body 26. Said recesses 40 can be realized in the form of closed pockets which are free of the material of the basic body 26 or—as in the realization looked at—can be open to the outside on at least one side. The recesses 40 are preferably arranged in the region of the end faces of the container 10. The internal recesses can be formed as a result of forming the basic body 26 in a grid structure when it is produced or when the basic body 26 is reworked, in particular as a result of perforating the basic body 26.

As a result of the choice of the material of the basic body and of the optional, above-described recesses, average material densities within the range of between 0.3 g/cm$^3$ and 2 g/cm$^3$ can be achieved in an advantageous manner. A container 10, which comprises a weight within the range of between 5 kg and 30 kg, can be provided in dependence on the material density and on the chosen dimensions.

FIG. 7 shows a further realization of the container 10. In order to avoid unnecessary repetition, just the differences to the above-described realization of FIGS. 1 to 5 will be explained.

In said realization, the container 10 comprises means 42, 44 which are attached to the bottom surface 15 of the bottom region 12 and to the top surface 21 of the transporting region 18. The attaching of the means 42, 44 is effected as reworking of the basic body 26. The means 42, 44 correspond in each case to a coating of the surface 15 or 21, said coating forming the bottom surface 16 or the receiving surface 22 with high-value surface characteristics with reference to mechanical stress, rigidity and strength.

Further realizations where just a coating of one single surface 15 or 21 or an additional coating of the end faces which are formed by the wall parts 30, of the transmission surfaces 32 and/or of the side flanks of the basic body 26 which are oriented in the conveying direction 28, are also possible. In particular, a coating on all sides of the basic body 26 is conceivable.

In particular, the above-mentioned coatings can be produced from a thermoplastic material. In addition, they are advantageously applied using so-called in-mold methods where the basic body 26 is back-injected in an injection mold with a material for producing these types of structures. Examples are back-foaming, in-mold-skinning, thermal embossing/stamping.

As an alternative to this or in addition to it, instead of a coating it is possible to provide a covering means which is bonded onto the associated surface of the basic body 26 or is coupled with the basic body 26 as a result of producing a positive locking and/or frictional locking connection.

The container 10 according to the above-described realizations can be used with existing conveying units by means of an adapter which comprises a receiving possibility for the container 10 and is provided with guide elements which fit the respective conveying unit. An example is shown in FIG. 8 in which the container 10 is arranged in an adapter 46 which is realized in the form of a tub. FIG. 8 shows a sectional view of the arrangement parallel to the conveying direction 28 and perpendicular to the bottom surface 16. The adapter 46 comprises guide elements 48, for example in the form of guide grooves which interact with corresponding elements of the conveying unit. The adapter 46 is produced in particular from a hard fiber material.

The invention claimed is:

1. A container for transporting items of luggage in a sorting system at an airport using a conveying system for conveying individual items including items of luggage, the container comprising:

a bottom region configured to be coupled with a conveying unit of the conveying system;

a transporting region supported by said bottom region and configured to receive an individual item of luggage to be transported;

said bottom region and said transporting region each being produced from a radiolucent material; and a one-part basic body of a radiolucent material being a foamed material molded part forming said bottom region and said transporting region.

2. The container according to claim 1, wherein said basic body is formed from a structurally rigid foam of thermoplastic material.

3. The container according to claim 1, wherein said foamed material molded part includes a thermoplastic-based particle foamed material.

4. The container according to claim 3, wherein said foamed material molded part includes a polypropylene-based particle foamed material.

5. The container according to claim 1, wherein said basic body has internal recesses.

6. The container according to claim 1, which further comprises:

a central, flat receiving surface disposed in said transporting region for receiving an item of luggage; and a holding structure raised above said receiving surface and surrounding said receiving surface.

7. The container according to claim 6, wherein said holding structure includes wall parts adjoining said receiving surface, being raised perpendicularly relative to said receiving surface and forming a front or rear edge relative to a conveying direction of the container.

8. The container according to claim 6, wherein said holding structure includes a pair of flat transition surfaces being inclined relative to said receiving surface, being connected to said receiving surface on both sides of said receiving surface and each forming a respective lateral edge relative to a conveying direction of the container.

9. The container according to claim 8, which further comprises:

a bottom surface disposed in said bottom region;

said inclined transition surfaces having a maximum height relative to said bottom surface; and said receiving surface having a height relative to said bottom surface being smaller than 50% of said maximum height of said transition surfaces.

10. The container according to claim 6, which further comprises:

a bottom surface disposed in said bottom region;

said holding structure having a maximum height (HMAX) relative to said bottom surface; and said receiving surface having a height relative to said bottom surface being smaller than 20% of said maximum height of said holding structure.

11. The container according to claim 6, wherein said holding structure includes a respective interface in each of said bottom region and said transporting region for stacking the container with other containers.

12. The container according to claim 1, wherein said basic body includes at least one surface being back-injected with a coating.

13. A sorting system for items of luggage at an airport, the sorting system comprising:
   a conveying system having conveying units for conveying items of luggage; and
   containers according to claim 1 being coupled with said conveying units for transporting the items of luggage.

* * * * *